Sept. 23, 1958  S. D. RUSSELL  2,853,000
BALING MACHINE
Filed Nov. 22, 1952  3 Sheets-Sheet 1
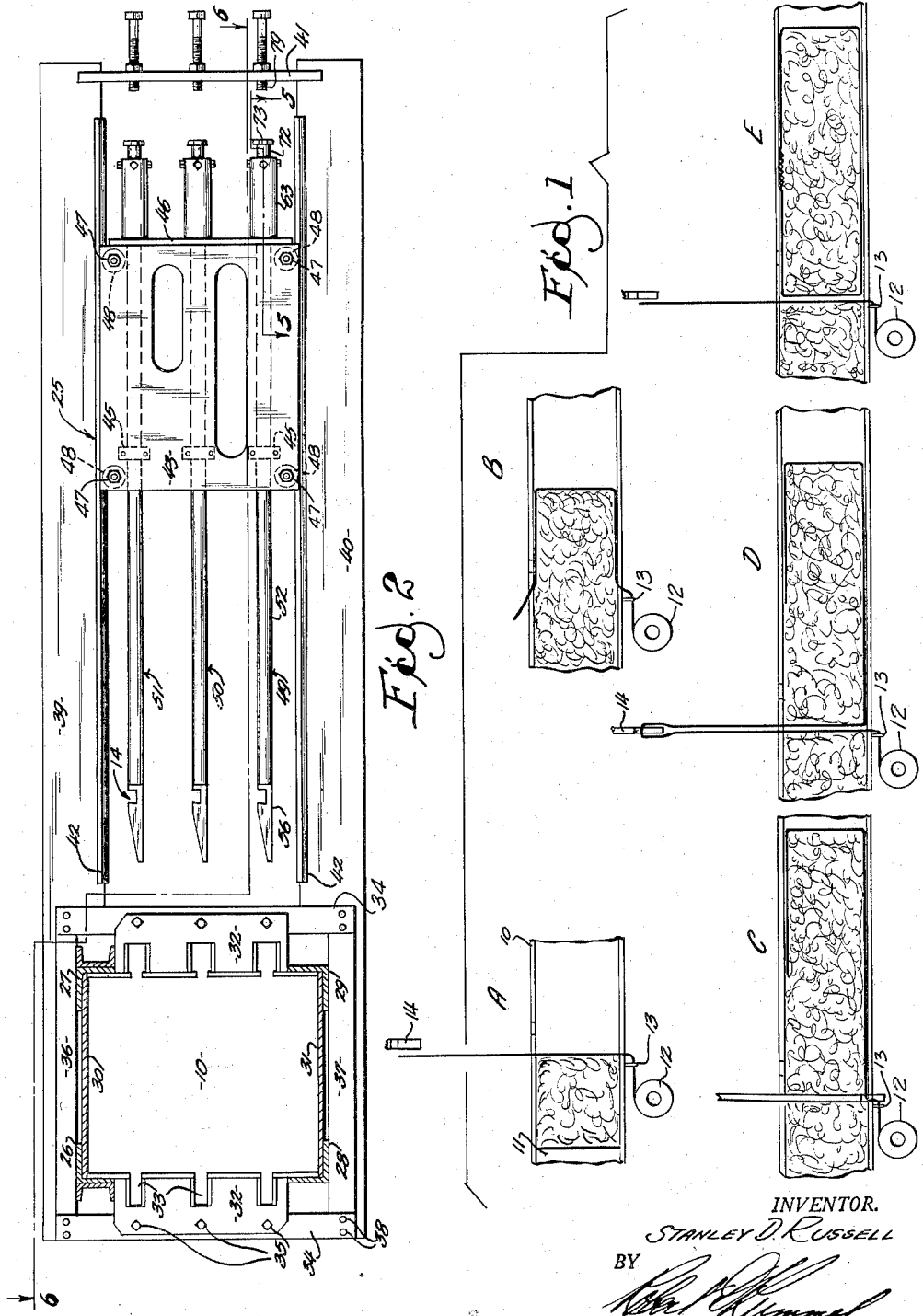
INVENTOR.
STANLEY D. RUSSELL
BY
ATTORNEY

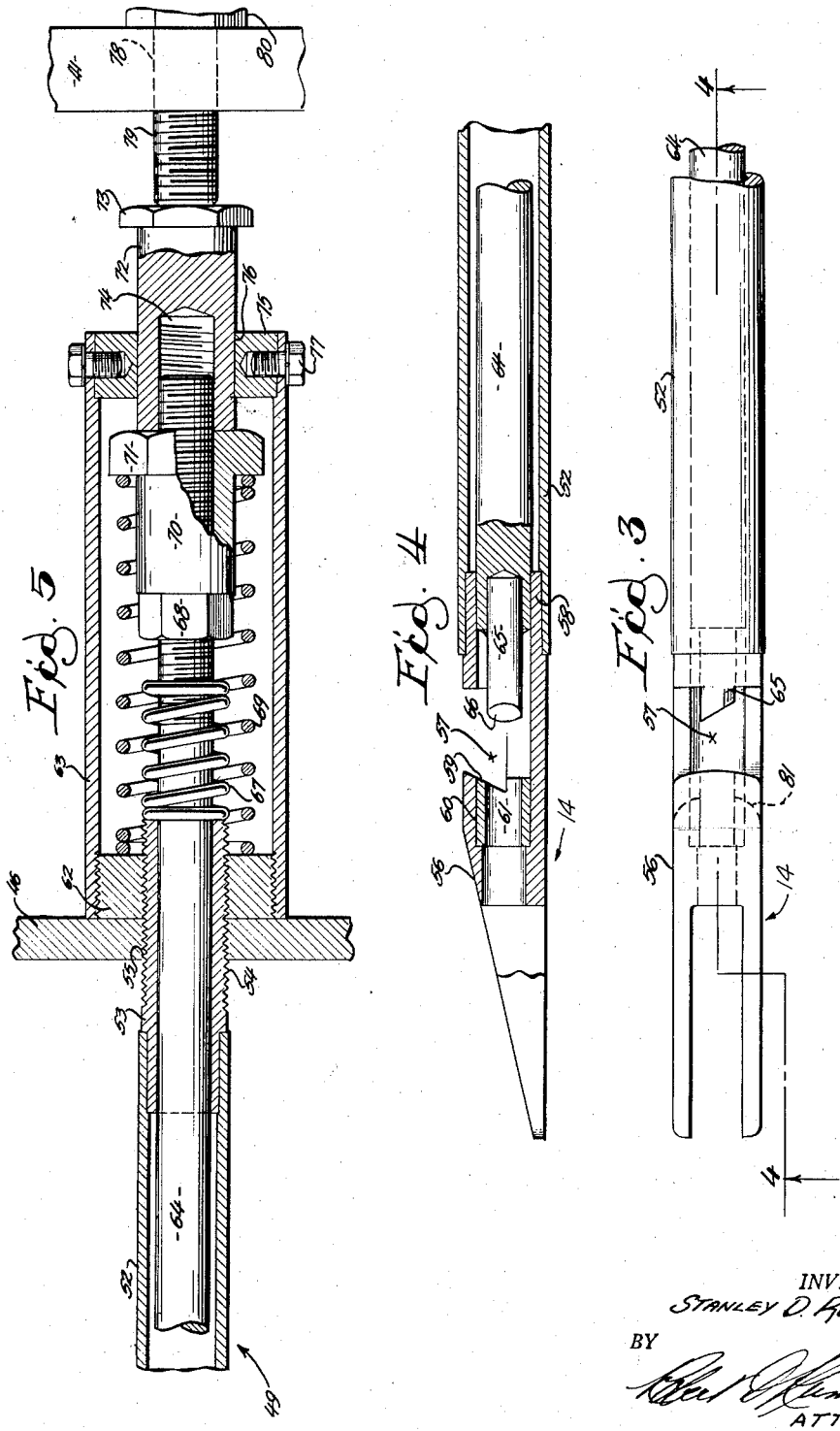

Sept. 23, 1958  S. D. RUSSELL  2,853,000
BALING MACHINE
Filed Nov. 22, 1952  3 Sheets-Sheet 3
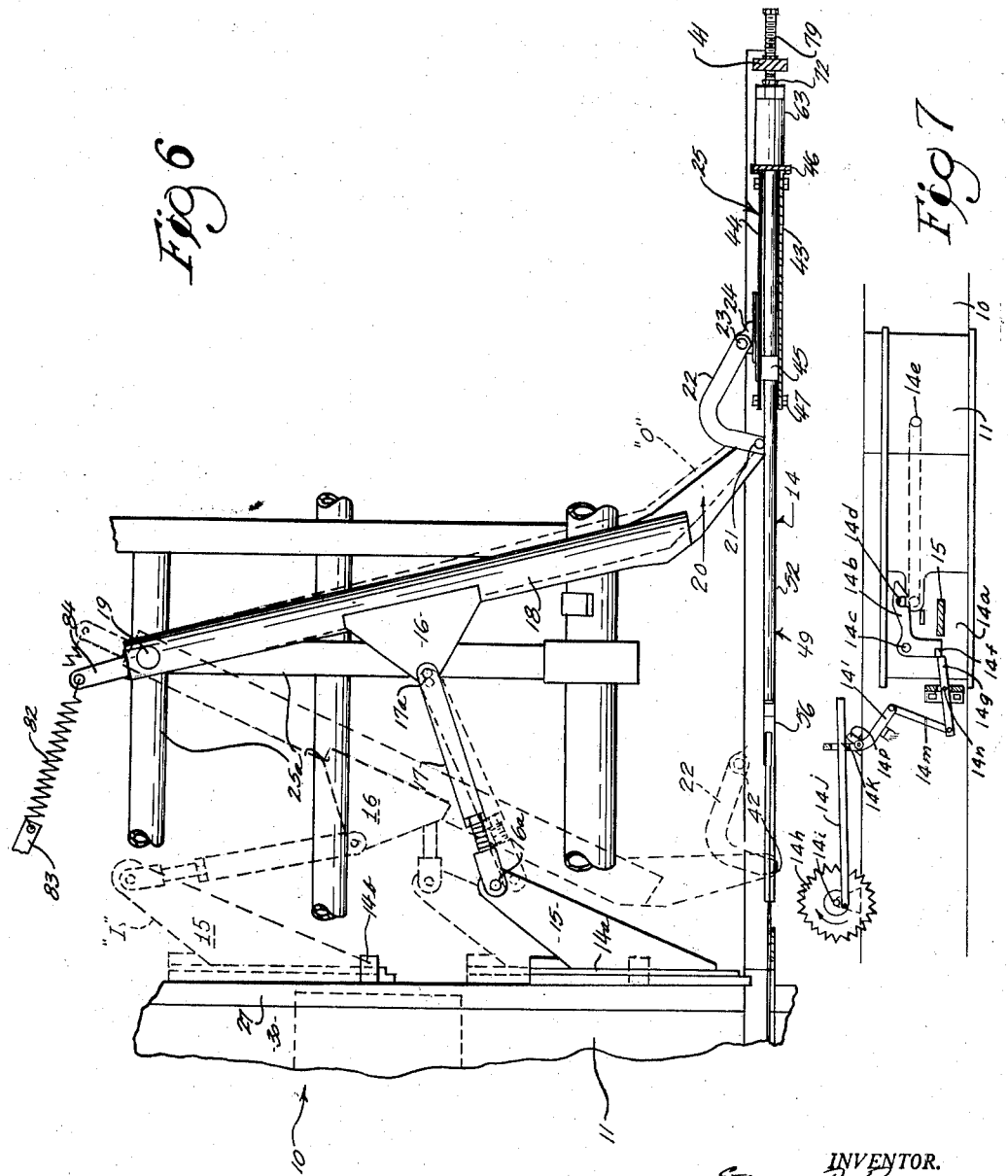
INVENTOR.
STANLEY D. RUSSELL
BY
ATTORNEY United States Patent Office 2,853,000
Patented Sept. 23, 1958

2,853,000

BALING MACHINE

Stanley D. Russell, Racine, Wis., assignor to J. I. Case Company, Racine, Wis., a corporation of Wisconsin Application November 22, 1952, Serial No. 322,058

14 Claims. (Cl. 100—19)

The present invention relates to baling devices and particularly to those constructions wherein a loop of wire is drawn across the path of the material to be baled for effecting the formation of bales of a predetermined size and weight.

A primary object of the present invention is the provision of an improved baler wherein the needle draws a loop of wire across the path of travel of the material to be baled and wherein the loop of wire is cut automatically after the loop of wire has been drawn across the baling chamber a predetermined distance.

A further object of the present invention is to provide improved means for effecting guided horizontal movement of the needle carriage.

Other further objects of the invention will be apparent to those skilled in the art from a reading of the complete specification and claims.

Referring to the drawings wherein is illustrated a preferred embodimnet of the invention:

Fig. 1 is a series of diagrammatic fragmentary plan views of a portion of a baling machine showing in views A, B, C, D, and E thereof the formation of a bale in a baling chamber and the manner in which a strand of wire is trained around the bale as the same is being formed.

Fig. 2 is a cross-sectional view taken on a plane at right angles to the longitudinal axis of the baling chamber and just rearwardly of the needle carriage, with parts removed.

Fig. 3 is a plan view of a portion of a needle shown in Fig. 2, slightly enlarged.

Fig. 4 is a sectional view taken on the line 4—4 of Fig. 3, with parts broken away.

Fig. 5 is a horizontal sectional view, with parts broken away, taken on the line 5—5 of Fig. 2, slightly enlarged.

Fig. 6 is a horizontal sectional view taken on the line 6—6 of Fig. 2, with parts removed.

Fig. 7 is a diagrammatic right side view of a portion of a baling machine illustrating the manner of operation of a needle actuating latch plate.

Referring to Fig. 1 of the drawings, the present invention is for use in combination with a baling machine of a well known and conventional type, this machine including a bale chamber 10 at one end of which is slidably received a reciprocating plunger 11. A source of wire 12 is suitably carried adjacent one side of the baling chamber 10, and a suitable guide or eye 13 is secured to the baling chamber adjacent the source of wire (see Fig. 1). The wire is drawn across the baling chamber, and hay or other like material is fed into the baling chamber, the plunger, upon rearward movement in this instance, pressing the hay or other like material into the bale being formed and then withdrawing to permit more hay to be fed into the baling chamber in front of the plunger. As the formation of the bale continues, see diagrams B and C of Fig. 1, the wire, which as previously stated extends across the baling chamber, is pulled rearwardly by the pressure of the hay and paid out around the bale being formed, and when a sufficient amount of material has been compressed by the plunger so as to form a completed bale, the end of the wire which was originally drawn across the baling chamber is positioned substantially medially of the length of the bale on the side opposite the source of wire. When the bale has reached a predetermined size or length, and when the same is of the correct size for tying, a needle or group of needles generally designated as 14 are driven across the baling chamber substantially in the plane of the eye 13 and engages the wire adjacent the eye 13 slightly to the rear thereof so as to carry a loop of the wire back across the baling chamber when the needle is returned to its inoperative position, diagram D of Fig. 1. Suitable cutting means associated with the needle is provided for cutting the wire at the end of the loop so that the wire which now completely encircles the bale can be tied by hand or by a suitable tying mechanism, not shown since it forms no part of the present invention, the completed bale now being permitted to move through the baling chamber with a new bale being formed in front of it, the wire forming the other strand of the loop being pulled rearwardly around the new bale being formed in the same manner as with respect to the previously described bale.

For initiating the action of the bale separating expedient when the desired length of bale is achieved, a mechanism is provided which is diagrammatically illustrated, since it has become conventional and forms no part of the invention. A latching plate or mechanism $14^a$ is slidable on conventional guides on the right side of the baling chamber 10 and carries a latch or hook member $14^b$ pivoted at $14^c$ thereon and provided with a notch $14^d$ which may engage a plunger pin $14^e$ but which normally moves back and forth in the path defined in dotted lines without entering notch $14^d$. Latch member $14^b$ has a portion $14^f$ engaged by a rockable detent lever $14^g$ which holds it in the position shown, clear of plunger pin $14^e$. Lever $14^g$ is controlled from a star wheel of conventional type $14^h$ suitably supported for rotation by reason of engagement with the bale being formed. A crank or the equivalent $14^i$ causes reciprocation of a trip rod $14^j$ which has a notched portion engaging at a predetermined point in its reciprocation with a catch portion $14^k$, pulling it forward and causing rocking movement of the catch and upward movement of a lever arm $14^l$ fixed in relation thereto, such movement, through a link $14^m$ causing rocking of lever $14^g$ in the direction indicated about a fixed fulcrum $14^n$. Rocking of lever $14^g$ releases portion $14^f$ whereupon latch member $14^b$ drops into the path of plunger pin $14^e$. Plunger pin $14^e$ then engages in notch $14^d$ the next time that plunger 11 reaches its rearmost position, Latching plate $14^a$ is then connected to plunger 11 and reciprocates with it to its forward-most position and back. The rearward movement of plunger 11 causes clockwise movement of the bale actuating star wheel $14^h$ causing additional rearward movement of trip rod $14^j$ and catch portion $14^k$ and causing a finger $14^p$ to raise trip rod $14^j$ out of engagement with catch portion $14^k$ whereupon lever arm $14^l$ immediately drops, placing lever $14^g$ in the path of portion $14^f$ of latch $14^b$. When latching plate $14^a$ returns to its initial or home position portion $14^f$ encounters lever $14^g$, raising latch member $14^b$ and disengaging it from plunger pin $14^e$. Such motion of latching plate $14^a$ causes actuation of the needles as will appear.

The motion of needles 14 is obtained from plunger 11, a latching plate $14^a$ being guided for sliding movement along the side of bale case 10 on the side opposite above mentioned eye 13, and arranged to be momentarily connected by mechanism now well-known, and including a pin $14^e$ fixed on plunger 11. Plate $14^a$ normally rests substantially in the position shown in Fig. 6, pin $14^e$ moving back and forth with plunger 11, but without affecting plate 14ᵃ, but, when the desired bale length is reached, as hereinbefore stated, suitable well-known mechanism not shown, connects pin 14ᵉ with plate 14ᵃ, pin 14ᵉ carrying the plate forward with the travel of plunger 11, and back again to its Fig. 6 position where the plate is unlatched and allowed to remain pending the completion of another bale.

Latch plate 14ᵃ has a laterally extended clevis 15, and the clevis 15 is interconnected to a clevis 16 by means of a suitable pivot pin 16ᵃ, adjustable link 17, and pivot pin 17ᵃ. Clevis 16 is fixed as by welding or the like to an arm 18, preferably tubular in cross section, which is swingably connected adjacent its forward end to a vertical post 19 for swinging movement in a substantially horizontal plane. The rearward end of the arm 18 has fixed therein a suitable clevis 20 which is pivotally connected at the end thereof by means of a suitable pin 21 to one end of a connecting link 22, connecting link 22 being substantially arcuate in shape as seen in the drawing. The other end of the link 22 is connected by means of a suitable pin 23 to a clevis 24, clevis 24 being suitably fixed, preferably by welding, to a needle carriage broadly designated as 25. The vertical post 19 is rigidly fixed to a supporting frame work 25ᵃ including fore-and-aft and transversely extending frame members rigidly interconnected so as to provide a suitable base for carrying the baling chamber 10 and its associated mechanisms.

Referring to Fig. 2 of the drawings, the baling chamber 10 is shown as including top and bottom fore-and-aft extending angle irons 26, 27, 28, and 29, the top angle irons 26 and 27 being suitably interconnected by a plate 30 and the bottom angle irons 28 and 29 being suitably connected by a plate 31. The angle irons 26, 27, 28 and 29 are also suitably interconnected by reinforcing plates 32, each of the plates 32 being provided with three laterally extending notches 33 which are each so positioned as to receive the strand of wire which is being trained around the bale being formed in a well known manner. The bale chamber 10 is thus rigid and substantially box-like in structure.

A supporting frame work including upwardly extending rigid members 34 positioned on opposite sides of the baling chamber 10 and rigidly fixed to the respective reinforcing plates 32 as by bolts or the like 35, and top and bottom members 36 and 37 secured to the opposite ends of the upwardly extending members 34 as by bolts or the like 38 and to the angle irons 26, 27, 28, and 29 in any suitable manner, is carried by the baling chamber 10. This supporting structure has suitably fixed thereto a pair of laterally extending frame members 39 and 40, and a rigid stop member 41 interconnects the lateral ends of the members 39 and 40, these members being in parallel relationship with respect to one another and preferably carried horizontally with respect to the ground. The inner edge of each of the members 39 and 40 has fixed thereto as by welding or the like a suitable guide 42, and the needle carriage 25 is movable supported between the respective guides 42 for guided horizontal movement as will be described presently.

The needle carriage 25 in the present instance consists of a pair of rigid plates 43 and 44 held in parallel spaced apart relationship by means of suitable spacers 45 and an end plate 46, the end plate 46 being welded to the plates 43 and 44 adjacent the right ends thereof as viewed in Fig. 2. A suitable bolt 47 interconnects the plates 43 and 44 at each corner thereof, and a roller 48 is rotatably carried by the bolt 47 between the plates 43 and 44. The rollers 48 are so spaced as to be in rolling engagement with each of the guides 42, and each of the rollers is so constructed as to prevent displacement of the carriage 25 off the guides 42.

The needle carriage 25 in the present instance carries three needles 49, 50, and 51, each of the needles being carried in parallel relationship with respect to the other needles. As previously suggested, the baling chamber 10 shown in Fig. 2 is so constituted as to train three strands of wire around the bale being formed, and the needles 49, 50, and 51 are so positioned as to draw a loop from each strand of wire across the baling chamber upon the bale's reaching a predetermined size and in a manner such as will be more fully described presently. It will be appreciated however, that the number of wires trained around a bale being formed is discretionary and depends upon such things as the size of the bale being formed and the weight thereof, and whereas the needle carriage 25 shown in the present instance is shown in association with three needles, the number of needles used in association with the carriage is not to be considered as limiting the scope of the invention in any way. Since the construction of each of the needles is identical with the others further discussion of the details in construction of these needle will be with reference to needle 49 only.

Needle 49 is formed in the present instance of a tubular member 52 which is supported intermediate its length in an aperture formed in one of the spacers 45. The right end of the tubular member 52, as viewed in Fig. 5, has rigidly fixed therein a co-axially extending tubular member 53 which has a threaded portion 54 formed on the end thereof. The end plate 46 has formed therein a threaded aperture 55 and the member 53 is threadedly received therein so that a portion thereof extends to the right of the plate 46, is fixed in relation to and may be considered a part of needle carriage 25. Adjacent the other end of the tubular member 52 is formed a hook or wire engaging portion 56, see Figs. 3 and 4, which is formed with a throat portion 57 and a neck portion 58, the neck portion 58 being received in the member 52 and rigidly fixed therein. The diameter of the axial bore of the neck portion 58 is substantially equal to the diameter of the axial bore of the member 53 and is slightly less than the diameter of the axial bore of the tubular member 52, and an insert 59, formed of hardened metal, is axially fixed in a bore 60 formed in the front portion of the hook 56. The insert is provided with a bore 61 which is substantially co-axial with the axial bore of the neck portion 58 and which is formed of a diameter substantially less than the diameter of the bore of the neck portion 58 for reasons which will be more fully explained hereinafter.

Referring again to Fig. 5, a spacer 62 is threaded on that portion of the member 53 which extends to the right of the end plate 46, and a tubular housing 63 threadedly receives the spacer 62 so that the housing 63 and the spacer 62 are positioned in abutting relationship with respect to the end plate 46. A punch element or rod 64 is slidably received in the axial bore formed in the member 53 and in the axial bore of the neck portion 58, and a suitable punch 65, having a face 66 that is slanted in relation to a plane normal to the axis of the punch, is axially fixed in the left end of the punch element 64 as viewed in Figs. 3 and 4 so as to extend to the left thereof, the punch 65 being carried substantially co-axially with the bore 61 and being formed of a size so as to provide a substantially tight fit therein when the punch element 64 is moved to the left a predetermined amount as will be appreciated more fully hereinafter. The axial bore of the member 53 and the axial bore of the neck portion 58 are such as to provide a relatively tight fit with respect to the punch element 64 so as to permit relative axial movement of the punch element 64 therein while still preventing any appreciable side to side play. The punch element 64 is formed of a length sufficient to protrude to the right of the member 53 and into the tubular housing 63, and a coiled spring 67 is received on that portion of the punch element 64 which protrudes into the housing 63, the right end of the member 53 providing a seat for the coiled spring 67. A jam nut or abutment 68 is threadedly received on the punch element 64 and is so positioned as to compress the coiled spring 67 upon a predetermined axial movement of the punch element 64 to the left. A second coiled spring 69 is received on the punch element 64 and encircles that portion of the member 53 extending into the housing 63, the coiled spring 67 and the jam nut 68; and a collar 70 having a head portion 71 is threadedly received on the punch element 64 and acts as a second abutment so as to compress the coiled spring 69 between the spacer 62 and the head 71, the jam nut 68 being urged against the collar 70 so as to prevent axial shifting of the collar 70 on the punch element 64. It will be appreciated that the compressive force of the spring 69 is such as to urge the collar 70 to the right which necessarily carries the punch element 64 to the right to the same extent that the collar is moved to the right. An abutment element 72 having a head portion 73 and an axially extending threaded aperture 74 formed in the left end thereof, is threadedly received on the right end of the punch element 64, and a suitable collar 75 having an aperture 76 formed therein for slidably receiving the abutment element 72 is suitably secured as by screws or the like 77 in the right end of the housing 63. The compressive force of the spring 69 is such as to position the punch element 64 in the tubular member 52 so that the head portion 71 is in contact with the collar 75, and adjustment of collar 70 on punch element 64 will accordingly determine the amount that punch 65 thereof will extend into the throat portion 57 of the hook 56.

The interconnecting or stop member 41 is provided with a threaded aperture 78 which receives therein a suitable bolt or stop 79, and a suitable nut 80 is received on the bolt 79 and jammed against the member 41 so as to lock the bolt 79 in a predetermined axial position with respect to the member 41. The bolt 79 extends a predetermined distance to the left of the member 41 and is positioned in axial alignment with the head 73 of the abutment element 72.

When the bale being formed in the baling chamber is a predetermined size, the tripping mechanism engages the latching mechanism with the plunger pin so as to cause the latch plate 14a also to be moved forwardly with the plunger. Forward movement of the latch plate 14a causes horizontal swinging movement of the arm 18 to the left about the axis of post 19 toward the baling chamber by reason of the interconnecting link 17, and the arm 18 is caused to move sufficiently to the left upon the plunger's being moved to its maximum forward position to effect guided horizontal movement of the needle carriage 15 to the left a distance sufficient to move the heads 56 of the needles 49, 50, and 51 across the baling chamber, as indicated by dotted lines I, Fig. 6. When the direction of movement of the plunger changes so that the plunger is caused to move rearwardly in a compressing direction, the arm 18 is caused to swing horizontally to the right about the axis of post 19. Interconnecting link 22 between the needle carriage 25 and the arm 18 causes guided horizontal movement of the needle carriage 25 to the right, and the strands of wire which were received in the throat portions 57 of the respective heads 56 are drawn across the baling chamber. When the plunger is moved to its maximum rearward position, the arm 18 is swung to the right a distance sufficient to cause guided horizontal movement of the needle carriage to the right a distance sufficient to move the heads 73 of the abutments 72 into abutting relationship with respect to the stop bolts 79 as seen in dotted lines "O" in Fig. 6, so that the punch elements 64 are caused to move to the left a distance sufficient to move the punches 65 into the bores 61 of the inserts 59. The wires, which have been drawn in the form of loops across the baling chamber, are each received in the throat portions so that they lie across the opening into the bores 61. Therefore, the edges of the oblique faces 66 of the punches 65 of the needles act in shearing relationship, each with respect to an edge of an insert 59 so as to cut the wire after the punch has been moved a predetermined distance into the insert. The oblique faces of the punches are so formed that the wires are cut each at only one place and the opposite ends of the wires after being cut are allowed sufficient time to clear the bores before the punches enter entirely therein.

The position of pivot pins 16a and 17a, together with the lengths of the clevises 15 and 16 and link 17 are such that, when plunger pin 14e moves rearwardly, carrying with it latch plate 14a link 17 will take a position substantially at right angles to the path of travel of latching plate 14a, toward the end of such movement, at which time needle carriage 25 will have been moved to the limit of its travel to the right, as seen in dotted lines O in Fig. 6, and which, when stops 79 are properly adjusted, will result in relative movement of punch elements 64 to the left, as seen in Fig. 5 a substantially greater distance than shown in the illustration. In fact nut 68 will have moved sufficiently to compress spring 67 to a considerable extent and punch 65 will have passed the proper distance into insert 61 to cut the loop of wire which has been engaged in throat 57. Owing to the angle of the face of punch 65 it will come into shearing relation with one side of insert 61 (the upper side, as seen in Fig. 3) whereupon the loop of wire will escape from throat 57 and there will be no tendency toward taking two simultaneous cuts of the wire at insert 61. In this manner the chopping out of any short pieces of wire is avoided which pieces might get into the bales and which feature has been a ground of serious objection to some prior bale binding mechanisms.

Latch plate 14a continues its rearward movement slightly beyond the above-indicated right angle position of link 17, to the full line position in Fig. 6 and this further movement causes a slight return movement of arm 18 which moves carriage 25 in a direction toward bale case 10 and relieves the pressure against stop bolts 79. This is the position in which the parts rest during the period when the bale is being formed and which may appropriately be termed the "home" positions, pin 14e moving back and forth idly and without engaging the mechanism on latch plate 14a. In this way springs 67 and 69 are relieved of continuous high pressure and will remain strong and resilient over a satisfactorily long period.

The adjustment of stop bolts 79, as will be apparent, determines the degree of penetration of punches 65 into inserts 61, and this can be very accurately adjusted by turning bolts 79 into or out of plate 41.

At such time as carriage 25 is moved to shift heads 73 away from stop bolts 79, the combined pressure of springs 67 and 69 is effective to retract or pull punches 65 out of inserts 61 in which they might otherwise have a tendency to remain, owing to the fairly close fit of the parts and possible accumulation of dirt or the like.

As will be apparent, initial forward movement of latch plate 14a (which is shown in Fig. 6 in an intermediate position) will cause a slight movement to the right of carriage 25, whereas the desired movement of carriage 25 is to the left in order to insert needles 14 into bale case 10. This, however, is no disadvantage since it will put punches 65 through their cutting cycle without any wire in place and which will have a tendency to keep them free and clear of foreign substances, much as a barber works his shears several times between actual cuttings to free them of fragments of hair.

It is worthy of note that, in the system contemplated the wire is bent once and for all about the end of the bale as indicated at B, Fig. 1. It then does not need to slide around the end of the bale as in many structures, the free end of the wire not being held but falling back as the bale moves through the baling chamber. This is apparent at C, Fig. 1, where the free end of the wire is the same length as it is at B. The additional wire is merely paid out from the wire source or spool 12 along the proximate side of the bale. This results in greatly decreased strain on the wire as compared with other systems. When the needle 14 engages the wire as at C, Fig. 1, the wire on the right side of the resulting loop comes from spool 12 and slides through throat 57 in needle 14 in order to reach the position shown at D, Fig. 1. In order to facilitate this the outer margin of throat 57, with respect to the remainder of needle 52, is rounded at 81 and preferably highly polished. This portion then acts as a very effective guide for placing the wire in exactly the right position to be cut by punch 65.

As hereinbefore stated, any suitable means is contemplated for tying the ends of the wire to reach the condition shown at E, Fig. 1 and likewise any well known or suitable means is contemplated for measuring the lengths of the bales and tripping the latch mechanism, these features forming no part of the present invention.

The force necessary to withdraw needles 49, 50, and 51 so as to pull the wire through the bale being greatest at the beginning of such movement, and link 17 then being in a less favorable position than other times, an assisting spring 82 is secured, in this instance in tension, between a portion 83 of the baler frame and an arm 84 rigidly attached to arm 18 forwardly of fulcrum post 19 so as to tend at all times to swing arm 18 towards the right in Fig. 6. When arm 18 is swung to the left, as when the needles are disposed across bale case 10, spring 82 will be stretched to the upper limit of its tension and will exert a substantial assisting force tending to withdraw the needles so that this burden does not devolve entirely on link 17.

What is claimed as new, desired to be secured by Letters Patent of the United States is:

1. In a baling machine having a baling chamber, a supporting frame carrying the baling chamber, a plunger reciprocable in said baling chamber for forming a bale therein, and a needle carriage carried adjacent the baling chamber at one side thereof and movable in a plane transverse to the direction of reciprocation of said plunger, the combination of an arm swingably connected at one end to said supporting frame adjacent the path of travel of said plunger for swinging movement toward and away from said plunger about a substantially vertical axis spaced from said chamber a substantial distance, a connecting link pivotally connected to said arm and with said plunger for effecting swinging movement of said arm toward said baling chamber upon said plunger's moving in a noncompressing direction and when said bale has reached a predetermined size, and an interconnecting link pivotally connected between the other end of said arm and said needle carriage for effecting guided horizontal movement of said needle carriage in a plane normal to the direction of movement of said plunger toward said baling chamber in response to said arm's being moved toward said baling chamber.

2. In a baling machine having a baling chamber, a supporting frame for carrying said baling chamber, a plunger reciprocable in said baling chamber for forming a bale therein, a needle carriage carried by the baling chamber at one side thereof and movable in a plane transverse to the direction of reciprocation of said plunger, and a latch plate slidably carried adjacent one side of said baling chamber and adjacent said needle carriage and caused to move fore-and-aft with said plunger when the bale being formed has reached a predetermined size, the improvement comprising means interconnected between said needle carriage and said latch plate for effecting guided horizontal movement of said needle carriage toward and away from said baling chamber in response to said latch plate's being moved fore-and-aft by said plunger, comprising an arm swingably connected at one end to said supporting frame on the same side of said needle carriage as said plunger, for swinging movement from side to side about a substantially vertical axis pivot spaced from said bale chamber, a connecting link pivotally connected to said latch plate and to said arm substantially medially of the length of said arm, whereby said arm is caused to swing in the direction of said baling chamber upon said latch plate's being moved in a direction away from said needle carriage by said plunger, and an interconnecting link between the other end of said arm and said needle carriage for effecting guided horizontal movement of said needle carriage toward said baling chamber in response to said arm's being moved toward said baling chamber.

3. In a binding mechanism for a baler of the type having a frame, a baling chamber, a plunger reciprocable in said chamber and needles arranged to be inserted transversely of the chamber for securing binding means about a formed bale, first mechanism for inserting the needles including a needle carriage to which said needles are secured, movable toward and away from the chamber, a pivot means on said frame and spaced from said baling chamber a distance equivalent to a substantial part of the movement of said needle carriage, an arm fulcrumed and swingable on said pivot toward and away from said chamber, a first link connection of fixed length between said carriage and said arm, second mechanism for connection to said plunger for reciprocation therewith, and a second link connection of fixed length between said second mechanism and said arm, in one position at right angles to a line between said pivot and the pivotal connection of the first link connection with said arm, said second mechanism being movable, when reciprocated by said plunger, from a position where said arm is swung close to said chamber to said right angle position and beyond to a position where the second link connection has passed by said right angle position and said arm has started to move again toward said baling chamber.

4. In a binding mechanism for a baler having a frame, a baling chamber, a plunger reciprocable in said chamber and needles arranged to be inserted transversely of the chamber for securing binding means about the formed bale, mechanism for inserting the needles including a needle carriage to which said needles are secured movable toward and away from the chamber, a pivot means on said frame and spaced from said baling chamber, an actuating lever arm mounted on said pivot for swinging movement and having a free end swingable generally in the direction of and to substantially the same extent as the movement of said needle carriage, means connecting said free end with said needle carriage, mechanism for connection with said plunger for reciprocation therewith, a link pivotally connected to said plunger mechanism and to said lever arm at a point intermediate said free end and said pivot, and the path of said plunger mechanism being such that in the rearmost position thereof said link will stand substantially at right angles to a line between said pivot and said means connecting said free end with said needle carriage.

5. In a binding mechanism for a baler having a frame, a baling chamber, a plunger reciprocable in said chamber and needles arranged to be inserted transversely of the chamber for securing binding means about the formed bale, mechanism for inserting the needles including a needle carriage to which said needles are secured movable toward and away from the chamber, a pivot means on said frame and supported in spaced relation to said baling chamber, an actuating lever arm mounted on said pivot for swinging movement and having a free end swingable generally in the direction of and to substantially the same extent as the movement of said needle carriage, means connecting said free end with said needle carriage, mechanism for connection with said plunger for reciprocation therewith, a link pivotally connected to said plunger mechanism and to said lever arm at a point intermediate said free end and said pivot, and the path of said plunger mechanism being so defined, that in the rearmost home position thereof said link will stand substantially at right angles to a line between said pivot and said means connecting said free end with said needle carriage, and in the forwardmost position said link will stand substantially parallel to said path of travel of said mechanism, whereby movement of said lever will be relatively slow in the region of said home position of said mechanism and relatively fast in the region of the opposite end the path of travel of said mechanism.

6. In a baling machine of the type having a baling chamber, a plunger reciprocable therein, a source of wire on one side of the baling chamber for paying out about a bale being formed, and a needle on the other side of the baling chamber lying in a plane transverse to the direction of movement of the plunger and having means restraining the needle to reciprocate across the baling chamber, to pick up said wire and pull it in a loop across said baling chamber; the combination of a head on said needle of hook-like configuration and providing a wire receiving throat portion, said needle being formed with a longitudinal bore therein which intersects said throat portion to define sharp edges at intersecting margins of said throat and said bore, a punch slidable in said bore so as to pass across in obstructing relation to said throat, means for reciprocating said punch a predetermined amount in said bore, and said punch being so shaped as to engage said wire when moved said predetermined amount and to force it and cut it against one edge defined by said bore and throat.

7. In a baling machine of the type having a baling chamber, a plunger reciprocable therein, a source of wire on one side of the baling chamber for paying out about a bale being formed, and a needle on the other side of the baling chamber lying in a plane transverse to the direction of movement of the plunger and having means restraining the needle to reciprocate across the baling chamber, to pick up said wire and pull it in a loop across said baling chamber; the combination of a head on said needle of hook-like configuration and providing a wire receiving throat portion, said needle being formed with a longitudinal bore therein which intersects said throat portion to define sharp edges at intersecting margins of said throat and said bore, a punch slidable in said bore so as to pass across in obstructing relation to said throat, means for reciprocating said punch a predetermined amount in said bore, and said punch having a portion so disposed as to engage said wire when moved said predetermined amount and to force it and cut it against one edge defined by said bore and throat.

8. In a baling machine of the type having a baling chamber, a plunger reciprocable therein, a source of wire on one side of the baling chamber for paying out about a bale being formed, and a needle on the other side of the baling chamber lying in a plane transverse to the direction of movement of the plunger and having means restraining the needle to reciprocate across the baling chamber, to pick up said wire and pull it in a loop across said baling chamber; the combination of a head on said needle of hook-like configuration and providing a wire receiving throat portion, said needle being formed with a longitudinal cylindrical bore therein which intersects said throat portion to define sharp edges at the intersecting margins of said throat and said bore, a cylindrical punch slidable in said bore so as to pass across in obstructing relation to said throat, means for reciprocating said punch a predetermined amount in said bore, and said punch having an end portion diagonally disposed with relation to the axis of said punch so as to engage said wire when moved said predetermined amount and to force it and cut it against one edge defined by said bore and throat.

9. In a baling machine of the type having a baling chamber, a plunger reciprocable therein, a source of wire on one side of the baling chamber for paying out about a bale being formed, and a needle on the other side of the baling chamber lying in a plane transverse to the direction of movement of the plunger and having means restraining the needle to reciprocate across the baling chamber, to pick up said wire and pull it in a loop across said baling chamber; the combination of a head on said needle of hook-like configuration and providing a wire receiving throat portion, said needle being formed with a longitudinal bore therein which intersects said throat portion to define sharp edges at the intersecting margins of said throat and said bore, a punch slidable in said bore so as to pass across in obstructing relation to said throat, means for reciprocating said punch a predetermined amount in said bore, and said punch having a sharp edge so disposed as to engage said wire when moved said predetermined amount and to force it and cut it against one edge defined by said bore and throat.

10. In a baling machine of the type having a baling chamber, a plunger reciprocable therein, a source of wire on one side of the baling chamber for paying out about a bale being formed, and a needle on the other side of the baling chamber lying in a plane transverse to the direction of movement of the plunger and having means restraining the needle to reciprocate across the baling chamber, to pick up said wire and pull it in a loop across said baling chamber; the combination of a head on said needle of hook-like configuration and providing a wire receiving throat portion, said needle being formed with a longitudinal bore therein which intersects said throat portion to define sharp edges at the intersecting margins of said throat and said bore, a punch slidable in said bore so as to pass across in obstructing relation to said throat, means adjustable for reciprocating said punch a predetermined amount in said bore, and said punch being so shaped as to engage said wire when said reciprocating means is suitably adjusted to force it and cut it against one edge defined by said bore and throat.

11. In a baling machine of the type having a baling chamber, a plunger reciprocable therein, a source of wire on one side of the baling chamber for paying out about a bale being formed, and a needle on the other side of the baling chamber lying in a plane transverse to the direction of movement of the plunger and having means restraining the needle to reciprocate across the baling chamber, to pick up said wire and pull it in a loop across said baling chamber; the combination of a head on said needle of hook-like configuration and providing a wire receiving throat portion, said needle being formed with a longitudinal bore therein which intersects said throat portion to define a sharp edge at the intersecting margin of said throat and said bore, a punch slidable in said bore so as to pass across in obstructing relation to said throat, said needle restraining means including a guide member and a stop member, a needle carriage fixed to said needle distal from said head and guided on the guide member and said stop member being supported in position to be approached by said needle carriage as said needle is reciprocated out of said baling chamber, said punch extending from said head through said needle and having a portion positioned to encounter said stop as said carriage approaches its outermost position whereby to arrest further movement of said punch, causing relative movement between said needle head and said punch and said punch being so shaped as to engage said wire to force it and cut it against said sharp edge defined by said bore and throat.

12. In a baling machine of the type having a baling chamber, a plunger reciprocable therein, a source of wire on one side of the baling chamber for paying out about a bale being formed, and a needle on the other side of the baling chamber lying in a plane transverse to the direction of movement of the plunger and having means restraining the needle to reciprocate across the baling chamber, to pick up said wire and pull it in a loop across said baling chamber; the combination of a head on said needle of hook-like configuration and providing a wire receiving throat portion, said needle being formed with a longitudinal bore therein which intersects said throat portion to define sharp edges at the intersecting margins of said throat and said bore, a punch slidable in said bore so as to pass across in obstructing relation to said throat, said needle restraining means including a guide member and a stop member, a needle carriage fixed to said needle distal from said head and guided on the guide member and said stop member being supported in position to be approached by said needle carriage as said needle is reciprocated out of said baling chamber, said punch extending from said head through said needle and having a portion positioned to encounter said stop as said carriage approaches its outermost position whereby to arrest further movement of said punch, causing relative movement between said needle head and said punch and said punch being so shaped as to engage said wire to force it and cut it against one edge defined by said bore and throat, and said stop being adjustable in position to cause the correct amount of movement of said punch to cut said wire against said one edge.

13. In a baling machine of the type having a baling chamber, a plunger reciprocable therein, a source of wire on one side of the baling chamber for paying out about a bale being formed, and a needle on the other side of the baling chamber lying in a plane transverse to the direction of movement of the plunger and having means restraining the needle to reciprocate across the baling chamber, to pick up said wire and pull it in a loop across said baling chamber; the combination of a head on said needle of hook-like configuration and providing a wire receiving throat portion, said needle being formed with a longitudinal bore therein which intersects said throat portion to define a sharp edge at the intersecting margin of said throat and said bore, a punch slidable in said bore so as to pass across in obstructing relation to said throat, said needle restraining means including a guide member and a stop member, a needle carriage fixed to said needle distal from said head and guided on the guide member and said stop member being supported in position to be approached by said needle carriage as said needle is reciprocated out of said baling chamber, said punch extending from said head through said needle and having a portion positioned to encounter said stop as said carriage approaches its outermost position whereby to arrest further movement of said punch, causing relative movement between said needle head and said punch providing an abutment adjacent said needle carriage, a spring engaged between said abutment and said needle carriage to be deformed by said relative movement to tend to return said punch to the position which it occupied prior to said relative movement, and said punch being so shaped as to engage said wire to force it and cut it against said sharp edge defined by said bore and throat.

14. In a baling machine of the type having a baling chamber, a plunger reciprocable therein, a source of wire on one side of the baling chamber for paying out about a bale being formed, and a needle on the other side of the baling chamber lying in a plane transverse to the direction of movement of the plunger and having means restraining the needle to reciprocate across the baling chamber, to pick up said wire and pull it in a loop across said baling chamber; the combination of a head on said needle of hook-like configuration and providing a wire receiving throat portion, said needle being formed with a longitudinal bore therein which intersects said throat portion to define a sharp edge at the intersecting margin of said throat and said bore, a punch slidable in said bore so as to pass across in obstructing relation to said throat, said needle restraining means including a guide member and a stop member, a needle carriage fixed to said needle distal from said head and guided on the guide member and said stop member being supported in position to be approached by said needle carriage as said needle is reciprocated out of said baling chamber, said punch extending from said head through said needle and having a portion positioned to encounter said stop as said carriage approaches its outermost position whereby to arrest further movement of said punch, causing relative movement between said needle head and said punch, spaced abutments adjacent said needle carriage, a spring compressed between one of said abutments and a portion of said needle carriage to urge said punch in a direction away from said sharp edge, a second spring interposed between said needle carriage and the second abutment and spaced therefrom so as to engage therebetween after predetermined relative movement between said needle and said punch whereby to assist the first-mentioned spring in initiating return movement of said punch relatively to said needle, and said punch being so shaped as to engage said wire to force it and cut it against said sharp edge defined by said bore and throat.

References Cited in the file of this patent

UNITED STATES PATENTS

| 743,998 | Wygant | Nov. 10, 1903 |
| 1,078,023 | Ward | Nov. 11, 1913 |
| 1,671,966 | Burkholder | June 5, 1928 |
| 2,610,573 | Altgelt | Sept. 16, 1952 |
| 2,619,028 | Jay | Nov. 25, 1952 |

FOREIGN PATENTS

| 92,046 | Germany | May 31, 1897 |
| 138,012 | Australia | July 18, 1950 |